(12) United States Patent
Cuvo et al.

(10) Patent No.: US 11,060,639 B2
(45) Date of Patent: Jul. 13, 2021

(54) ADAPTER COUPLING

(71) Applicant: Victaulic Company, Easton, PA (US)

(72) Inventors: Anthony J. Cuvo, Coopersburg, PA (US); Matthew A. Bowman, Palmer, PA (US)

(73) Assignee: Victaulic Company, Easton, PA (US)

( * ) Notice: Subject to any disclaimer, the term of this patent is extended or adjusted under 35 U.S.C. 154(b) by 0 days.

(21) Appl. No.: 16/413,726

(22) Filed: May 16, 2019

(65) Prior Publication Data
US 2019/0271420 A1    Sep. 5, 2019

Related U.S. Application Data

(63) Continuation of application No. 15/387,894, filed on Dec. 22, 2016.
(Continued)

(51) Int. Cl.
| | | |
|---|---|---|
| *F16L 17/04* | (2006.01) | |
| *F16L 23/024* | (2006.01) | |
| *F16L 23/032* | (2006.01) | |
| *F16L 23/22* | (2006.01) | |
| *F16L 21/08* | (2006.01) | |

(Continued)

(52) U.S. Cl.
CPC ............. *F16L 17/04* (2013.01); *F16L 23/024* (2013.01); *F16L 23/032* (2013.01); *F16L 23/22* (2013.01); *F16L 47/24* (2013.01); *F16L 21/08* (2013.01); *F16L 47/14* (2013.01)

(58) Field of Classification Search
CPC . F16L 17/04; F16L 47/24; F16L 23/22; F16L 23/032; F16L 23/024; F16L 47/14; F16L 21/08; Y10T 29/49947; Y10T 29/49948; Y10T 29/53657

USPC ....... 285/323, 367, 368, 373, 410, 412, 415, 285/420; 29/525.01, 525.02, 235
See application file for complete search history.

(56) References Cited

U.S. PATENT DOCUMENTS

| | | |
|---|---|---|
| 1,020,123 A | 3/1912 | Brampton et al. |
| 1,074,395 A | 9/1913 | Welch |

(Continued)

FOREIGN PATENT DOCUMENTS

| | | |
|---|---|---|
| CN | 1221089 | 6/1999 |
| CN | 1959175 | 5/2007 |

(Continued)

OTHER PUBLICATIONS

Non-final Office Action in U.S. Appl. No. 15/593,662, titled "Sprung Coupling"; dated Jun. 24, 2019; 5 pages.

(Continued)

*Primary Examiner* — Sarang Afzali
*Assistant Examiner* — Darrell C Ford
(74) *Attorney, Agent, or Firm* — Ballard Spahr LLP

(57) ABSTRACT

A combination includes a plurality of segments attached to one another end to end around a central space. A channel is disposed between the sides of the segments. A sealing ring is positioned in the channels. A tube has a first end disposed within the central space. A first protrusion extends radially outwardly from the tube and limits the extent to which the tube can extend into the central space. The combination is configured such that an end of a pipe element may be axially inserted into the central space and fasteners can be tightened to draw the segments toward one another.

13 Claims, 7 Drawing Sheets

Related U.S. Application Data

(60) Provisional application No. 62/271,395, filed on Dec. 28, 2015.

(51) Int. Cl.
*F16L 47/14* (2006.01)
*F16L 47/24* (2006.01)

(56) References Cited

U.S. PATENT DOCUMENTS

| | | | |
|---|---|---|---|
| 1,203,989 A | 11/1916 | Dehn | |
| 1,287,108 A | 12/1918 | Robinson et al. | |
| 1,379,811 A | 5/1921 | Fyffe | |
| 1,497,549 A | 6/1924 | Conradi | |
| 1,649,594 A | 11/1927 | Johnson | |
| 1,770,271 A | 7/1930 | Hoppes | |
| 1,831,641 A | 11/1931 | Skinner | |
| 1,834,968 A | 12/1931 | Rector | |
| 1,999,045 A | 4/1935 | Goetz | |
| 2,021,081 A | 11/1935 | Nagao | |
| 2,021,082 A | 11/1935 | North | |
| 2,067,428 A * | 1/1937 | Wallis | F16L 17/04 137/505.25 |
| 1,969,043 A | 8/1937 | Sharp | |
| 2,094,258 A | 9/1937 | Thompson | |
| 2,128,720 A | 8/1938 | Tweedale | |
| 2,412,394 A | 12/1946 | Giles | |
| 2,426,423 A | 8/1947 | Woolsey | |
| 2,225,208 A | 12/1947 | Crickmer | |
| 2,459,251 A | 1/1949 | Stillwagon | |
| 2,463,235 A | 3/1949 | Andrews | |
| 2,491,004 A | 12/1949 | Graham | |
| 2,635,901 A | 4/1953 | Osborn | |
| 2,775,806 A | 1/1957 | Love | |
| 2,926,028 A | 2/1960 | Hookings et al. | |
| 2,958,546 A | 11/1960 | Lee | |
| 3,014,259 A | 12/1961 | Louis | |
| 3,054,629 A | 9/1962 | Piatek | |
| 3,116,078 A | 12/1963 | Scherer | |
| 3,142,502 A | 7/1964 | Luther | |
| 3,148,896 A | 9/1964 | Chu | |
| 3,153,550 A | 10/1964 | Hollett | |
| 3,235,293 A | 2/1966 | Condon | |
| 3,362,730 A | 1/1968 | Clair et al. | |
| 3,414,297 A | 12/1968 | Pollia | |
| 3,466,069 A | 9/1969 | Hoke et al. | |
| 3,507,520 A * | 4/1970 | Hubscher | F16L 21/00 285/110 |
| 3,517,701 A | 6/1970 | Smith | |
| 3,550,638 A | 12/1970 | Smith | |
| 3,596,935 A | 8/1971 | McGeoch, Sr. | |
| 3,633,943 A | 1/1972 | Ramm et al. | |
| 3,680,894 A | 8/1972 | Young | |
| 3,768,819 A | 10/1973 | Burkert | |
| 3,776,579 A * | 12/1973 | Gale | F16L 27/12 285/233 |
| 3,788,677 A | 1/1974 | Stade et al. | |
| 3,794,360 A | 2/1974 | Bachle et al. | |
| 3,825,286 A | 7/1974 | Henry, III | |
| 3,861,723 A | 1/1975 | Kunz et al. | |
| 3,920,270 A | 11/1975 | Babb, Jr. | |
| 3,944,260 A | 3/1976 | Petroczky | |
| 4,018,979 A | 4/1977 | Young | |
| 4,073,514 A | 2/1978 | Pate | |
| 4,119,333 A | 10/1978 | Straub | |
| 4,123,090 A | 10/1978 | Kotsakis et al. | |
| 4,183,555 A * | 1/1980 | Martin | B21D 39/04 285/382.4 |
| 4,225,160 A | 9/1980 | Ortloff | |
| 4,249,786 A * | 2/1981 | Mahoff | F16L 23/04 439/192 |
| 4,273,367 A | 6/1981 | Keeney et al. | |
| 4,284,298 A | 8/1981 | Kaufmann, Jr. | |
| 4,326,737 A * | 4/1982 | Lehmann | F16L 23/04 285/112 |
| 4,372,587 A | 2/1983 | Roche | |
| 4,408,788 A | 10/1983 | Beukema | |
| 4,443,029 A | 4/1984 | Laxo | |
| 4,461,498 A | 7/1984 | Kunsman | |
| 4,471,979 A | 9/1984 | Gibb et al. | |
| 4,522,434 A | 6/1985 | Webb | |
| 4,568,112 A | 2/1986 | Bradley, Jr. et al. | |
| 4,610,471 A | 9/1986 | Halen et al. | |
| 4,611,839 A | 9/1986 | Rung et al. | |
| 4,629,217 A | 12/1986 | Straub | |
| 4,633,913 A | 1/1987 | Carty et al. | |
| 4,639,016 A * | 1/1987 | Rogers | F16L 55/1608 138/97 |
| 4,639,020 A | 1/1987 | Rung et al. | |
| 4,652,023 A | 3/1987 | Timmons | |
| 4,664,422 A | 5/1987 | Straub | |
| 4,678,208 A | 7/1987 | De Raymond | |
| 4,702,499 A | 10/1987 | deRaymond et al. | |
| 4,792,160 A | 12/1988 | Hwang | |
| 4,819,974 A | 4/1989 | Zeidler | |
| 4,838,584 A | 6/1989 | Dierksmeier | |
| 4,842,306 A | 6/1989 | Zeidler et al. | |
| 4,861,075 A | 8/1989 | Pepi et al. | |
| 4,893,843 A | 1/1990 | DeRaymond | |
| 4,896,902 A | 1/1990 | Weston | |
| 4,898,407 A | 2/1990 | Zeidler | |
| 5,018,768 A | 5/1991 | Palatchy | |
| 5,022,685 A | 6/1991 | Stiskin et al. | |
| 5,080,400 A | 1/1992 | Adamek | |
| 5,121,946 A | 6/1992 | Jardine | |
| 5,137,305 A | 8/1992 | Straub | |
| 5,161,836 A | 11/1992 | McKinnon | |
| 5,203,594 A | 4/1993 | Straub | |
| 5,230,537 A | 7/1993 | Newman | |
| 5,273,322 A | 12/1993 | Straub | |
| 5,280,970 A | 1/1994 | Straub | |
| 5,354,108 A | 10/1994 | Sander | |
| 5,437,482 A | 8/1995 | Curtis | |
| 5,452,922 A | 9/1995 | Ziu | |
| 5,603,350 A | 2/1997 | Stoll et al. | |
| 5,605,865 A | 2/1997 | Maniar et al. | |
| 5,641,185 A | 6/1997 | Harth | |
| 5,675,873 A | 10/1997 | Groess | |
| 5,681,062 A | 10/1997 | Fukao et al. | |
| 5,713,607 A * | 2/1998 | Webb | F16L 39/005 285/123.1 |
| 5,722,702 A | 3/1998 | Washburn | |
| 5,758,907 A | 6/1998 | Dole et al. | |
| 5,769,467 A | 6/1998 | Bridges | |
| 5,772,257 A | 6/1998 | Webb et al. | |
| 5,786,054 A | 7/1998 | Platusich et al. | |
| 5,782,499 A | 9/1998 | Esser | |
| 5,813,437 A | 9/1998 | Esser | |
| 5,911,446 A | 6/1999 | McLennan et al. | |
| 5,961,154 A | 10/1999 | Williams et al. | |
| 6,030,006 A | 2/2000 | Lin | |
| 6,056,332 A | 5/2000 | Foster | |
| 6,065,784 A | 5/2000 | Lundstrom | |
| 6,070,911 A * | 6/2000 | Namikawa | F16L 25/026 277/654 |
| 6,076,861 A | 6/2000 | Ikeda | |
| 6,131,957 A | 10/2000 | Saito | |
| 6,170,884 B1 * | 1/2001 | McLennan | F16L 17/04 285/112 |
| 6,276,726 B1 | 8/2001 | Daspit | |
| 6,276,729 B1 | 8/2001 | Sanwald et al. | |
| 6,305,719 B1 | 10/2001 | Smith, Jr. et al. | |
| 6,328,352 B1 | 12/2001 | Geppert et al. | |
| 6,367,849 B1 | 4/2002 | Tatsuta et al. | |
| 6,450,551 B1 | 9/2002 | Lee | |
| 6,499,771 B1 | 12/2002 | Snyder, Sr. et al. | |
| 6,502,865 B1 | 1/2003 | Steele | |
| 6,505,865 B1 | 1/2003 | Minemyer | |
| 6,626,466 B1 | 9/2003 | Dole | |
| 6,672,631 B1 | 1/2004 | Weinhold | |
| 6,749,232 B2 | 6/2004 | Wachter | |
| 6,921,115 B2 * | 7/2005 | Gill | F16L 23/16 285/110 |
| 7,070,209 B2 | 7/2006 | Collins | |

(56) References Cited

U.S. PATENT DOCUMENTS

| | | | |
|---|---|---|---|
| 7,086,131 B2 | 8/2006 | Gibb et al. | |
| 7,090,259 B2 | 8/2006 | Dole | |
| 7,341,287 B2 | 3/2008 | Gibb et al. | |
| 7,434,846 B2 | 10/2008 | Baumgartner | |
| 7,490,866 B2 | 2/2009 | Webb et al. | |
| 7,500,699 B2 | 3/2009 | Snyder, Sr. et al. | |
| 7,523,963 B2 | 4/2009 | Draper | |
| 7,644,960 B2 | 1/2010 | Case, Sr. et al. | |
| 7,654,587 B2 | 2/2010 | Gibb et al. | |
| 7,712,796 B2 | 5/2010 | Gibb et al. | |
| 7,726,703 B2 | 6/2010 | Porter et al. | |
| 7,789,434 B2 | 9/2010 | Nagle et al. | |
| 7,789,713 B2 | 9/2010 | Slepov | |
| 7,798,535 B2 | 9/2010 | Calhoun | |
| 7,841,630 B1 | 11/2010 | Auray et al. | |
| 7,861,982 B1 | 1/2011 | McClure | |
| 7,921,536 B2 | 4/2011 | Dole | |
| 7,988,287 B1 | 8/2011 | Dole et al. | |
| 7,996,981 B2 | 8/2011 | Dole et al. | |
| 8,136,847 B2 | 3/2012 | Madara et al. | |
| 8,424,179 B2 | 4/2013 | Webb et al. | |
| 8,517,430 B2 | 8/2013 | Dole et al. | |
| 8,777,277 B2 | 7/2014 | Dole et al. | |
| 8,820,795 B2 | 9/2014 | Dole | |
| 8,827,214 B2 | 9/2014 | Ogawa | |
| 9,151,422 B2 | 10/2015 | Kayacik et al. | |
| 9,482,374 B2 | 11/2016 | Henry | |
| 9,791,083 B2 * | 10/2017 | Gibb | F16L 17/04 |
| 9,890,884 B1 | 2/2018 | Chiproot | |
| 9,976,677 B2 | 5/2018 | Lurk | |
| 9,979,103 B2 * | 5/2018 | Pari | H01R 13/6581 |
| 10,458,579 B2 | 10/2019 | Bowman et al. | |
| 10,627,025 B2 | 4/2020 | Bowman et al. | |
| 10,641,421 B2 * | 5/2020 | Beagen, Jr. | F16L 21/065 |
| 10,661,488 B2 * | 5/2020 | French | B29D 23/003 |
| 10,704,511 B2 * | 7/2020 | Williams | F02M 35/10144 |
| 10,731,780 B2 | 8/2020 | Bowman et al. | |
| 10,859,190 B2 | 12/2020 | Bowman et al. | |
| 10,883,636 B2 * | 1/2021 | Schilling | F16L 33/2073 |
| 10,890,283 B2 * | 1/2021 | Surjaatmadja | F16L 23/003 |
| 10,962,159 B2 * | 3/2021 | Kujawski, Jr. | F16L 37/0885 |
| 2002/0135184 A1 | 9/2002 | Snyder, Sr. et al. | |
| 2002/0185868 A1 | 12/2002 | Snyder, Sr. et al. | |
| 2002/0195820 A1 * | 12/2002 | Surjaatmadja | F16L 27/0861 285/373 |
| 2003/0020276 A1 | 1/2003 | Steele | |
| 2004/0080157 A1 * | 4/2004 | Borgmeier | B21D 39/06 285/189 |
| 2004/0237632 A1 | 12/2004 | Van Keeken | |
| 2005/0001428 A1 | 1/2005 | Scherrer | |
| 2005/0028366 A1 | 2/2005 | Bien et al. | |
| 2005/0067538 A1 | 3/2005 | Stigler | |
| 2005/0082831 A1 | 4/2005 | Borland | |
| 2005/0212284 A1 | 9/2005 | Dole | |
| 2005/0253029 A1 * | 11/2005 | Gibb | F16L 17/04 248/158 |
| 2005/0253380 A1 | 11/2005 | Gibb et al. | |
| 2006/0087121 A1 | 4/2006 | Bradley | |
| 2006/0103136 A1 * | 5/2006 | Krengel | F16L 13/141 285/371 |
| 2006/0138776 A1 | 6/2006 | Amedure et al. | |
| 2006/0208486 A1 | 9/2006 | Kim | |
| 2006/0214422 A1 | 9/2006 | Cuvo et al. | |
| 2007/0024056 A1 | 2/2007 | Borland | |
| 2007/0090646 A1 | 4/2007 | Dole et al. | |
| 2007/0296213 A1 | 12/2007 | Jones et al. | |
| 2008/0007061 A1 * | 1/2008 | Gibb | F16L 17/04 285/364 |
| 2008/0054636 A1 | 3/2008 | Reid | |
| 2008/0093847 A1 | 4/2008 | Sundholm | |
| 2008/0129048 A1 | 6/2008 | Nagle et al. | |
| 2008/0265568 A1 | 10/2008 | Bekkevold | |
| 2008/0272595 A1 | 11/2008 | Gibb et al. | |
| 2008/0284161 A1 | 11/2008 | Dole et al. | |
| 2009/0127846 A1 | 5/2009 | Dole et al. | |
| 2009/0160183 A1 | 6/2009 | Felber | |
| 2009/0172939 A1 | 8/2009 | Gibb et al. | |
| 2009/0206598 A1 | 8/2009 | Gibb et al. | |
| 2010/0148493 A1 | 6/2010 | Madara et al. | |
| 2010/0197627 A1 | 8/2010 | Baudoin et al. | |
| 2010/0289257 A1 | 11/2010 | Madara et al. | |
| 2010/0296925 A1 | 11/2010 | Sakai | |
| 2010/0320756 A1 | 12/2010 | Gibb et al. | |
| 2010/0320758 A1 | 12/2010 | Sisk | |
| 2010/0327576 A1 | 12/2010 | Linhorst et al. | |
| 2011/0062706 A1 | 3/2011 | Henry | |
| 2011/0154646 A1 | 6/2011 | Hagiya | |
| 2011/0254268 A1 | 10/2011 | Johnson et al. | |
| 2012/0025524 A1 | 2/2012 | Krausz et al. | |
| 2012/0061956 A1 | 3/2012 | Nijsen et al. | |
| 2012/0074689 A1 | 3/2012 | Petersen et al. | |
| 2012/0098259 A1 | 4/2012 | Sarkisian et al. | |
| 2012/0205909 A1 | 8/2012 | Bird | |
| 2012/0235405 A1 | 9/2012 | Dole et al. | |
| 2012/0256415 A1 | 10/2012 | Dole | |
| 2012/0256418 A1 | 10/2012 | Horgan | |
| 2012/0306198 A1 * | 12/2012 | McDonald Pinedo | F16L 23/032 285/323 |
| 2013/0125373 A1 * | 5/2013 | Bancroft | F16L 23/08 29/525.01 |
| 2013/0127160 A1 | 5/2013 | Bancroft et al. | |
| 2013/0181446 A1 | 7/2013 | Le Clinche | |
| 2013/0200610 A1 | 8/2013 | Cygler, III et al. | |
| 2013/0319568 A1 * | 12/2013 | Daugherty | F16L 9/147 138/109 |
| 2013/0327415 A1 | 12/2013 | Camp, Jr. et al. | |
| 2014/0070529 A1 | 3/2014 | Bancroft et al. | |
| 2014/0239633 A1 | 8/2014 | Swingley | |
| 2014/0327238 A1 | 11/2014 | Bowman | |
| 2015/0001846 A1 * | 1/2015 | Griffin | F16L 23/0286 285/368 |
| 2015/0021911 A1 | 1/2015 | Bowman et al. | |
| 2015/0176728 A1 | 6/2015 | Bowman | |
| 2015/0204471 A1 | 7/2015 | Sato | |
| 2015/0362103 A1 * | 12/2015 | Kishi | G06F 17/50 285/399 |
| 2016/0084420 A1 | 3/2016 | Barrientos | |
| 2017/0184226 A1 | 6/2017 | Cuvo et al. | |
| 2017/0328500 A1 | 11/2017 | Bowman et al. | |
| 2017/0328507 A1 | 11/2017 | Sith et al. | |
| 2018/0163905 A1 | 6/2018 | Ohnemus et al. | |
| 2018/0163906 A1 | 6/2018 | Ohnemus et al. | |
| 2018/0200550 A1 | 7/2018 | Bancroft et al. | |
| 2019/0032824 A1 | 1/2019 | McNamara et al. | |
| 2019/0032825 A1 | 1/2019 | McNamara et al. | |
| 2020/0088329 A1 * | 3/2020 | Madara | F16L 21/06 |
| 2020/0208765 A1 * | 7/2020 | Kishi | F16L 25/065 |
| 2020/0232586 A1 * | 7/2020 | Luers | F16L 21/04 |
| 2020/0263818 A1 * | 8/2020 | Prince | F16L 21/03 |
| 2020/0292110 A1 * | 9/2020 | Bunn, Sr. | F16L 21/04 |
| 2020/0408339 A1 * | 12/2020 | Tan | F16L 23/22 |
| 2021/0071794 A1 * | 3/2021 | Chan | F16K 51/00 |
| 2021/0108747 A1 * | 4/2021 | Iida | F16L 25/12 |

FOREIGN PATENT DOCUMENTS

| | | |
|---|---|---|
| CN | 101886721 | 11/2010 |
| CN | 102345774 | 2/2012 |
| CN | 102933886 | 2/2013 |
| CN | 204204640 | 12/2014 |
| CN | 105423015 | 3/2016 |
| CN | 105473923 | 4/2016 |
| DE | 669605 | 12/1938 |
| DE | 3111997 | 10/1982 |
| DE | 3443942 | 6/1985 |
| DE | 3443943 | 6/1985 |
| DE | 19532356 | 4/1996 |
| DE | 10006029 | 8/2001 |
| DE | 2020120111293 | 1/2013 |
| EP | 0462454 | 12/1991 |
| EP | 2112414 | 10/2009 |

(56) References Cited

FOREIGN PATENT DOCUMENTS

| | | |
|---|---|---|
| EP | 2113701 | 11/2009 |
| EP | 1840439 | 6/2010 |
| EP | 2487397 | 8/2012 |
| FR | 1201165 A | 12/1959 |
| FR | 2683017 | 4/1993 |
| FR | 2685057 A1 | 6/1993 |
| FR | 2747453 | 4/1997 |
| FR | 2921985 | 3/2013 |
| GB | 1499346 A | 2/1978 |
| GB | 2098297 | 11/1981 |
| GB | 2211255 | 8/1989 |
| JP | S52126317 | 3/1951 |
| JP | 5615891 | 7/1979 |
| JP | S5615891 U | 2/1981 |
| JP | 59004228 | 2/1984 |
| JP | S524772 | 2/1993 |
| JP | 6147362 | 5/1994 |
| JP | 07269764 | 10/1995 |
| JP | 2001304468 | 10/2001 |
| JP | 2002147664 | 5/2002 |
| JP | 2006250247 | 9/2006 |
| JP | 2007537414 | 12/2007 |
| JP | 2008202791 | 9/2008 |
| JP | 2009167971 | 7/2009 |
| JP | 2011163474 | 8/2011 |
| JP | 2012026578 | 2/2012 |
| JP | 2012189147 | 10/2012 |
| JP | 2013542382 | 11/2013 |
| JP | 2014001848 | 1/2014 |
| KR | 100315861 | 11/2001 |
| KR | 20090007813 | 4/2009 |
| KR | 100904419 | 6/2009 |
| KR | 20090066767 | 6/2009 |
| WO | 9703811 | 2/1997 |
| WO | 2005114023 | 12/2005 |
| WO | 2008144302 | 11/2008 |
| WO | 2013077966 | 5/2013 |

OTHER PUBLICATIONS

Final Office Action in U.S. Appl. No. 15/593,662, titled "Sprung Coupling"; dated Jan. 30, 2020; 7 pages.
Non-final Office Action in U.S. Appl. No. 16/413,737, titled "Sprung Coupling"; dated Aug. 26, 2019; 8 pages.
Non-final Office Action in U.S. Appl. No. 16/816,780, titled "Sprung Coupling"; dated Jun. 8, 2020; 6 pages.
Victaulic Company, *Plaintiff* v. *Anvil International, LLC*; Defendant and Counterclaim-Plaintiff Anvil International LLC's Initial Invalidity Contentions; Mar. 15, 2021; 189 pages.

* cited by examiner

ADAPTER COUPLING

CROSS REFERENCE TO RELATED APPLICATION

This application is a continuation of and claims benefit of priority to U.S. patent application Ser. No. 15/387,894, filed Dec. 22, 2016, which application is based upon and claims the benefit of priority to U.S. Provisional Application No. 62/271,395, filed Dec. 28, 2015, both applications being hereby incorporated by reference.

FIELD OF THE INVENTION

This invention relates to mechanical couplings for joining pipe elements end to end, and in particular, for joining flanged pipe elements to non-flanged pipe elements.

BACKGROUND

As taught in the prior art, connecting a non-flanged polymer pipe element to a flanged pipe element of either polymer or metal, requires the use of a backing ring, usually made of metal, and a polymer butt flange adapter. To effect the connection, the backing ring is slipped over the free end of the non-flanged polymer pipe element and then the butt flange adapter is coaxially aligned with and fused to the free end of the non-flanged pipe element in a butt joint. This creates a flanged facing on the previously non-flanged polymer pipe element which is then engaged, flange to flange, with the flanged pipe element. The backing ring is then brought to bear on the flange of the butt flange adapter and bolts are used to attach the backing ring to the flange of the flanged pipe element, capturing and retaining the flange of the butt flange adapter to the flanged pipe element. For polymer to metal flange engagement under low pressure applications the soft polymer flange of the butt flange adapter deforms upon contact with the metal flange of the flanged pipe element to form a fluid-tight seal. For higher pressure applications a face seal may be used between the interfacing flanges to ensure fluid tightness.

While effective, this prior art practice suffers various disadvantages. Multiple parts, namely, the butt flange adapter and the backing ring, must be supplied and assembled onto the non-flanged polymer pipe element. A fusing operation is necessary to join the butt flange adapter to the non-flanged polymer pipe. This requires a fusing machine, which requires power or a heat source for operation. The fusing operation itself takes time and is affected by the weather when joints are to be made in the field. For example, cold weather will slow the fusing process, and can stop it entirely if severe enough. There is clearly a need for improved components and a method for joining non-flanged polymer pipe elements to flanged pipe elements.

SUMMARY

The invention concerns a combination, wherein in an example embodiment the combination comprises a plurality of segments attached to one another end to end by fasteners to form a loop around a central space. Each of the segments comprises a first side and a second side. A channel is disposed between the first and second sides of the plurality of segments. The channel extends circumferentially around and faces the central space. A flexible, resilient sealing ring is positioned in the channel. The sealing ring comprises first and second lobes that each extend radially inwardly to define first and second ring inner seal surfaces, respectively. The example combination further comprises a tube comprising a first end disposed within the central space. A first protrusion extends radially outwardly and is disposed proximate the second sides of the plurality of segments. The first protrusion limits an extent to which the first end of the tube can extend axially into the central space. A second protrusion extends radially outwardly and is disposed within the central space. The second protrusion is axially disposed between the first protrusion and the first end. The second sides of the plurality of segments and the first lobe of the sealing ring are both axially disposed between the first and second protrusions. The first lobe is axially disposed between the second protrusion and the second sides of the plurality of segments, and the second protrusion extends radially outwardly farther than an inner radial extent of the first lobe such that the second protrusion and first lobe help retain the tube within the sealing ring. In the example embodiment a sealing surface is disposed between the first and second protrusions on an outer surface of the tube. The combination is shaped and configured such that an end of a first pipe element may be axially inserted into the central space. The combination is shaped and configured such that once the end of the first pipe element is properly inserted into the central space, the fasteners can be tightened so as to draw the plurality of segments toward one another and the central space and thereby cause (1) the first ring inner seal surface to sealingly engage the sealing surface of the tube, and (2) the second ring inner seal surface to sealingly engage a sealing surface of the first pipe element.

In an example combination the second protrusion comprises a first surface that slopes radially inwardly as it progresses axially toward the first end of the tube. The second ring inner seal surface has a diameter sized to receive the first pipe element upon insertion of the first pipe element into the central space. The plurality of segments comprises no more than two the segments by way of example, and the fasteners comprise two threaded fasteners.

In an example combination the second protrusion comprises a first surface that slopes radially inwardly as it progresses axially toward the first end of the tube. Further by way of example the second ring inner seal surface has a diameter sized to receive the first pipe element upon insertion of the first pipe element into the central space. Also by way of example the sealing ring has an outer surface engaged with and supporting the plurality of segments in a preassembled state in spaced apart relation sufficient to allow the first pipe element to be inserted into the central space.

In an example combination a plurality of segments comprises no more than two the segments. Further by way of example the fasteners comprise two threaded fasteners. In an example the first and second protrusions each extend continuously around an entire circumference of the tube. Also by way of example the combination is shaped and configured to join the first pipe element with a second pipe element.

In an example combination according to the invention the first and second pipe elements comprise different types of pipe elements. The combination is an adapter coupling that is shaped and configured to join the different types of pipe elements to each other. By way of example the fasteners, and the sealing ring together define a preassembled pipe coupling. In an example embodiment the combination is a preassembled pipe coupling that includes the plurality of segments, the fasteners, the sealing ring, and the tube. By way of example the sealing ring comprises a radially-inwardly projecting rib disposed between the first and second lobes.

In an example embodiment the second protrusion extends radially outwardly less far than an inner radial extent of the second sides of the plurality of segments prior to tightening of the fasteners such that there is a radial clearance between the second protrusion and the second sides of the plurality of segments. In a further example the combination is shaped and configured to join the first pipe element with a second pipe element, and the combination is shaped and configured to be attached to the first pipe element before being attached to the second pipe element.

In an example embodiment of a combination the first pipe element comprises a plain end pipe element.

By way of example the combination is shaped and configured to join the first pipe element with a second pipe element, and the second pipe element comprises a flanged pipe element. In an example embodiment the tube and plurality of segments are shaped and configured to mount to the flanged pipe.

The invention further encompasses a method of using the combination according to the invention. An example method comprises:

while the first end of the tube is disposed in the central space, axially inserting the end of the first pipe element into the central space; and while the end of the first pipe element is inserted into the central space, tightening the fasteners, which draws the plurality of segments toward one another and the central space and thereby causes (1) the first ring inner seal surface to sealingly engage the sealing surface of the tube, and (2) the second ring inner seal surface to sealingly engage the sealing surface of the first pipe element.

In an example method the tightening causes the second sides of the segments to move radially inwardly past an outer radial extent of the second protrusion. A further example method of comprises attaching a second pipe element to the tube so as to form a fluid-tight seal between the second pipe element and the tube. In another example method the attaching occurs after the axially inserting and after the tightening.

The invention also encompasses a tube shaped and configured for engagement with a coupling. In an example embodiment the tube comprises a plurality of segments attached to one another end to end by fasteners to form a loop around a central space. Each of the segments comprising a first side and a second side, wherein a channel is disposed between the first and second sides of the plurality of segments, wherein the channel extends circumferentially around and faces the central space. A flexible, resilient sealing ring is positioned in the channel. The sealing ring comprises first and second lobes that extend radially inwardly to define first and second ring inner seal surfaces, respectively. By way of example the tube comprises a first end configured to be disposed within the central space when the tube is engaged with the coupling. A first protrusion extends radially outwardly and is shaped and configured to be disposed proximate the second sides of the plurality of segments when the tube is engaged with the coupling. The first protrusion is shaped and configured to limit an extent to which the first end of the tube can extend axially into the central space. A second protrusion extends radially outwardly, and a sealing surface is disposed between the first protrusion and second protrusion on an outer surface of the tube. The tube is shaped and configured such that when the tube is engaged with the coupling, (1) the second protrusion is within the central space, (2) the second sides of the plurality of segments and first lobe are both axially disposed between the first and second protrusions, (3) the first lobe is axially disposed between the second protrusion and the second sides of the plurality of segments, (4) the second protrusion extends radially outwardly farther than an inner radial extent of the first lobe such that the second protrusion and first lobe help retain the tube within the sealing ring, (5) an end of a first pipe element may be axially inserted into the central space, and (6) the fasteners can be tightened so as to draw the plurality of segments toward one another and the central space and thereby cause the first ring inner seal surface to sealingly engage the sealing surface of the tube in this example embodiment.

In an example embodiment of a combination with the sealing ring, the first lobe is axially disposed between the first and second protrusions. The first end and second protrusions of the tube are disposed within a central opening formed by the sealing ring. The second protrusion extends radially outwardly farther than an inner radial extent of the first lobe such that the second protrusion and first lobe help retain the first end of the tube within the central opening.

In an example embodiment the tube is shaped and configured such that when the tube is engaged with the coupling and the end of the first pipe element is properly inserted into the central space, the fasteners can be tightened so as to draw the plurality of segments toward one another and the central space and thereby cause (1) the first ring inner seal surface to sealingly engage the sealing surface of the tube, and (2) the second ring inner seal surface to sealingly engage a sealing surface of the first pipe element.

In an example embodiment of the tube, the coupling is shaped and configured to join the first pipe element to a second pipe element. In another example embodiment, the tube is shaped and configured such that when the tube is engaged with the coupling, the second protrusion extends radially outwardly less far than an inner radial extent of the second sides of the plurality of segments such that there is a radial clearance between the second protrusion and the second sides of the plurality of segments.

DETAILED DESCRIPTION

Figure 1:
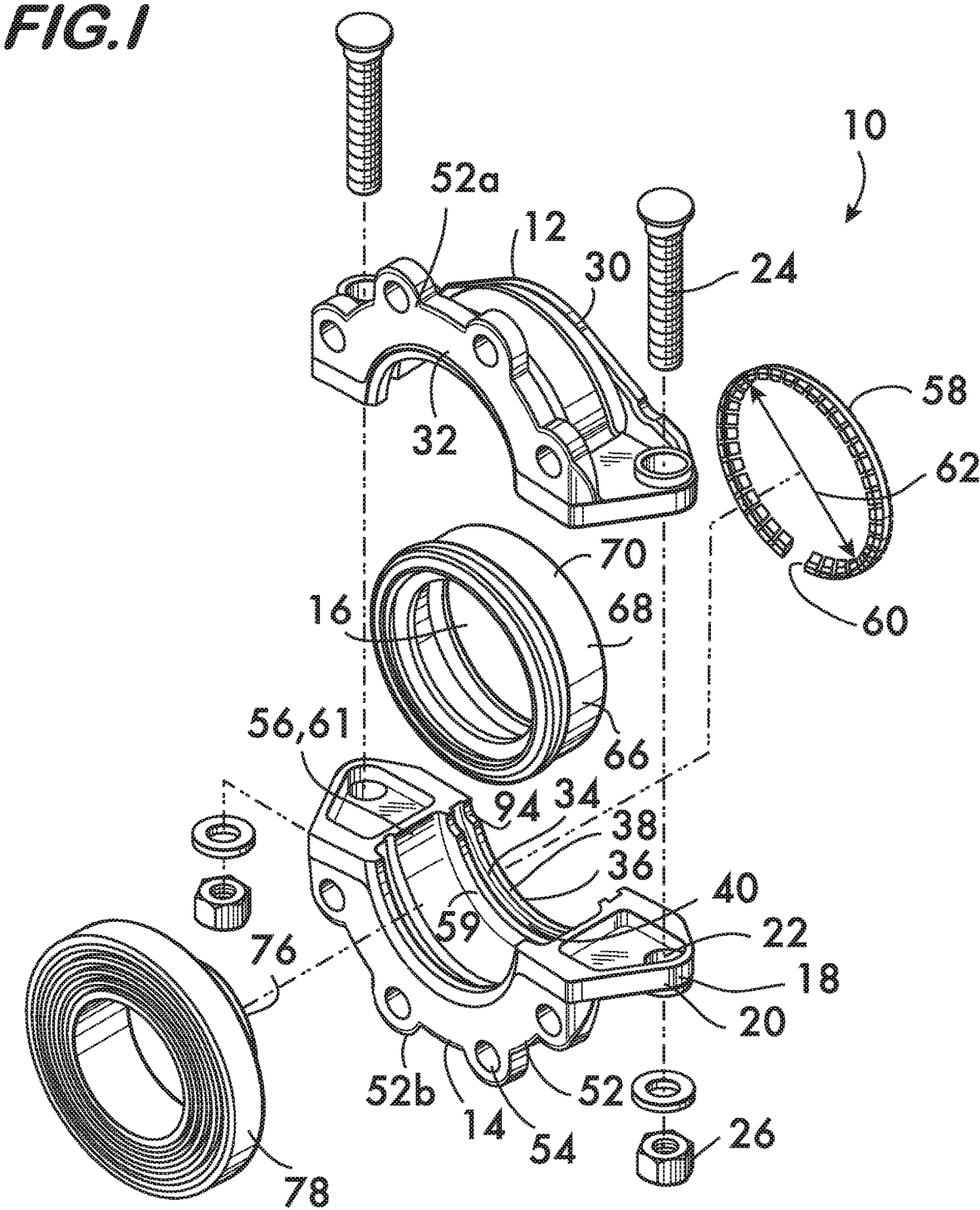
FIG. 1 is an isometric exploded view of an example coupling according to the invention.
Figure 4:
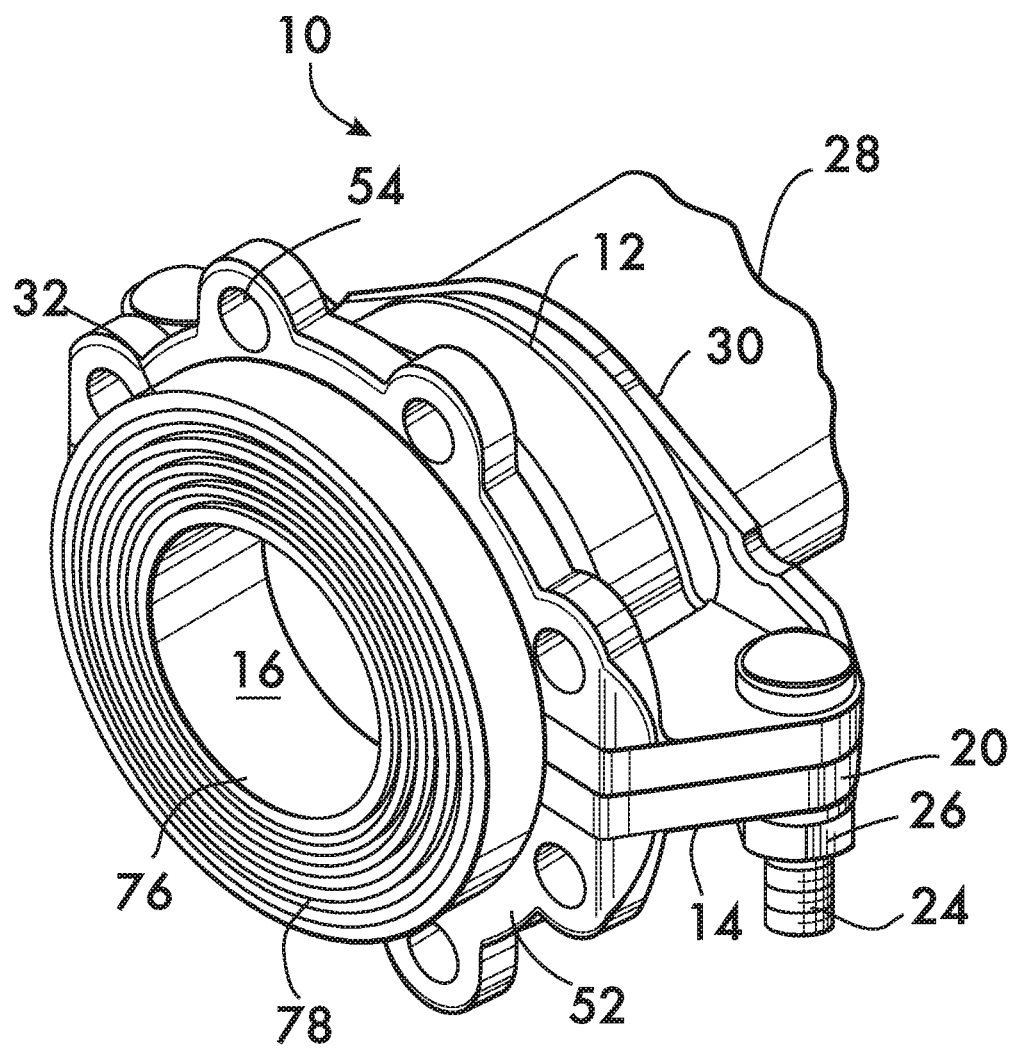
FIG. 4 is an isometric view of the coupling shown in FIG. 1 shown engaging a non-flanged pipe element.
Figure 5:
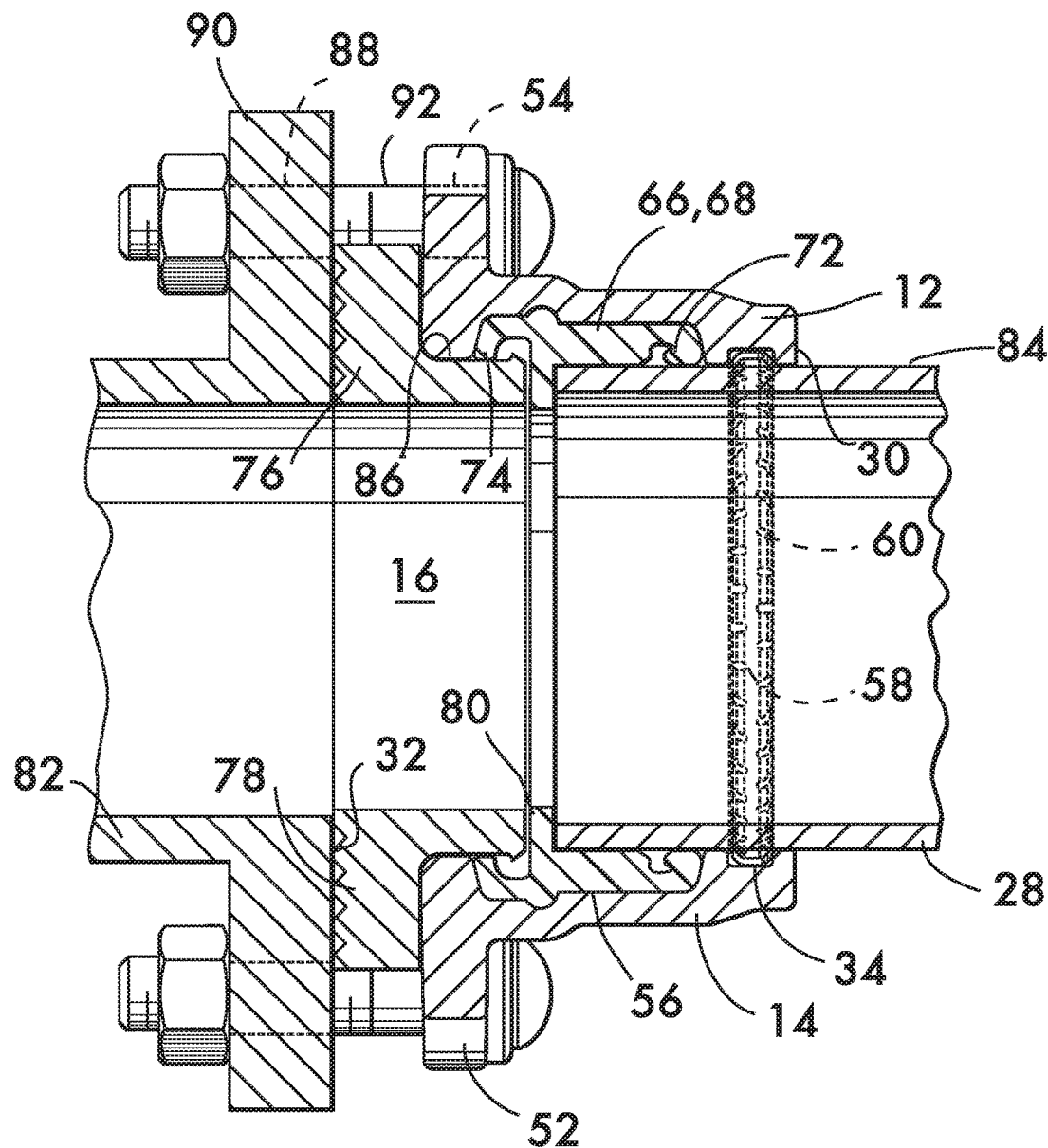
FIG. 5 is a longitudinal sectional view showing the coupling of FIG. 1 connecting a flanged pipe element to a non-flanged pipe element.

FIG. 1 shows an example embodiment of a coupling 10 for joining flanged pipe elements to non-flanged pipe elements according to the invention. Coupling 10 comprises a plurality of segments, in this example, two segments 12 and 14 attached to one another end to end and surrounding a central space 16. Segments 12 and 14 are advantageously formed of cast ductile iron, although other materials may also be used. Attachment of the segments 12 and 14 is effected via adjustable attachment members 18 positioned at each end of each segment. In this example attachment members 18 comprise projections 20 that extend from the ends of the segments, the projections having openings 22 that receive a fastener, such as bolt 24 and nut 26. Upon tightening of the fasteners 24, 26 the segments 12 and 14 are drawn toward one another and the central space 16 to effect connection with a pipe element 28 as shown in FIGS. 4 and 5 and described below.

Figure 2:
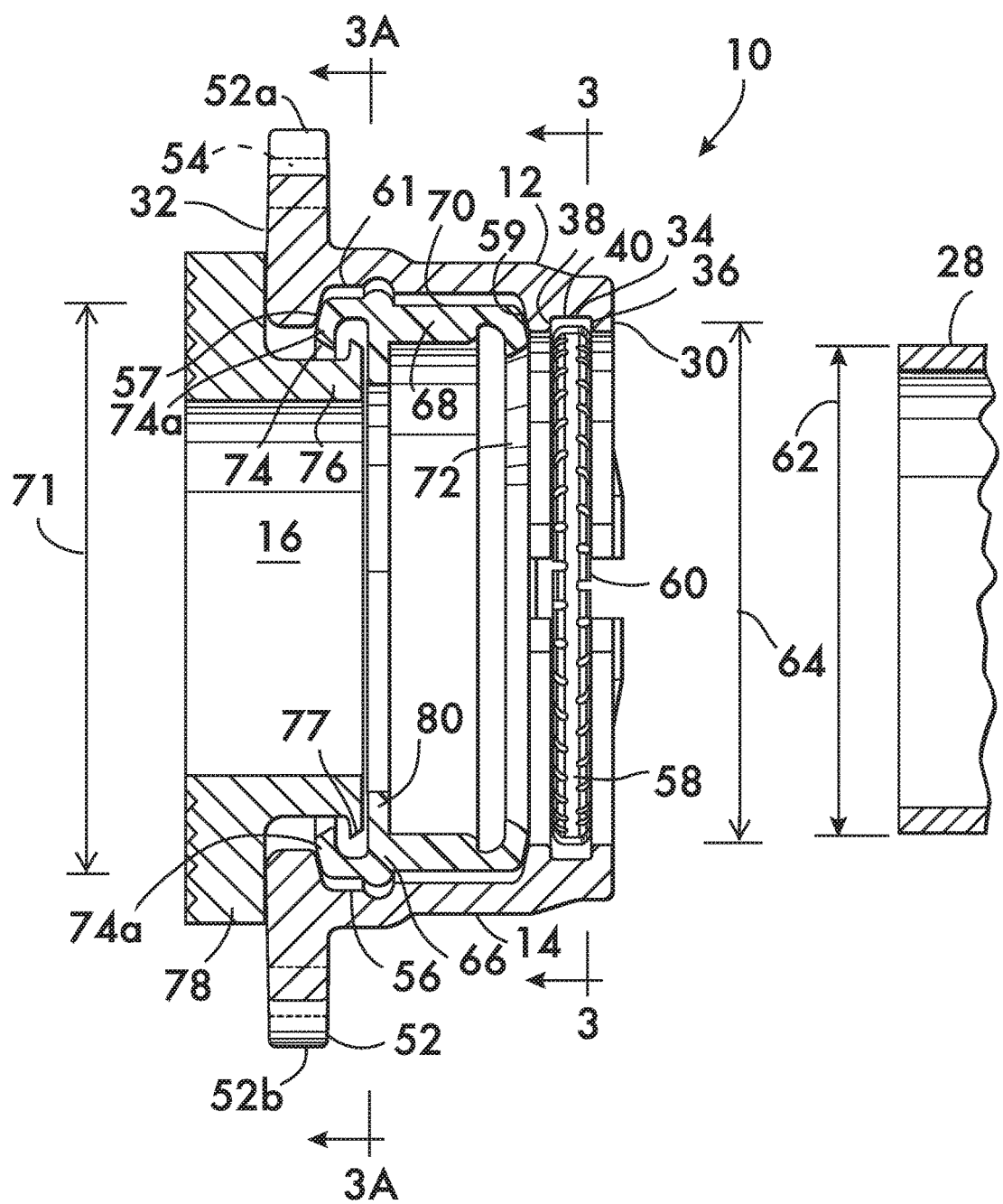
FIG. 2 is a longitudinal sectional view taken at line 2-2 of FIG. 1A.
Figure 3:
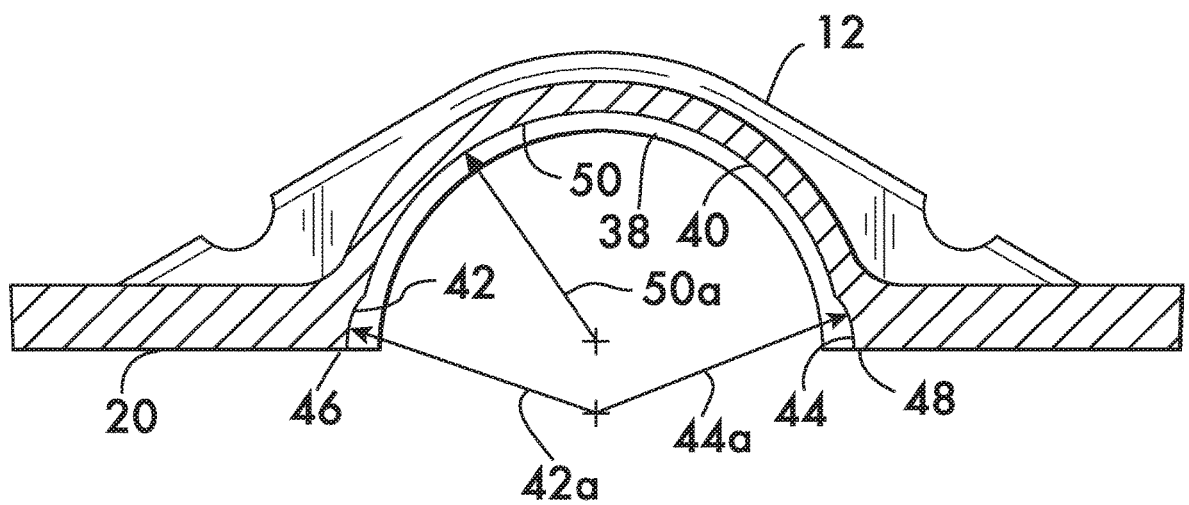
FIG. 3 is a cross sectional view taken at line 3-3 of FIG. 2.

As shown in FIG. 2, coupling 10 has first and second sides 30 and 32 oppositely disposed from one another. A first channel 34 is positioned in the segments 12 and 14 proximate to the first side 30. First channels 34 extend circumferentially around and face the central space 16. First channels 34 are each defined by two side surfaces 36 and 38 arranged in spaced apart relation to one another. A floor surface 40 extends between the side surfaces. As shown in FIG. 3, the floor surface 40 comprises first and second surface portions 42 and 44 arranged respectively at opposite ends 46 and 48 of the segments 12 and 14 (segment 12 being shown). A third surface portion 50 is positioned between the first and second surface portions 42 and 44. Each surface portion 42, 44 and 50 has a respective radius of curvature 42a, 44a and 50a. Radii 42a and 44a are greater than the radius of curvature 50a of the third surface portion 50. The centers of radii 42a and 44a are offset from the center of radius 50a as depicted in FIG. 3. The first and second surface portions 42 and 44 may each have a length extending from about 5% to about 45% of the total length of the first channel 34 for practical coupling designs.

Figure 3A:
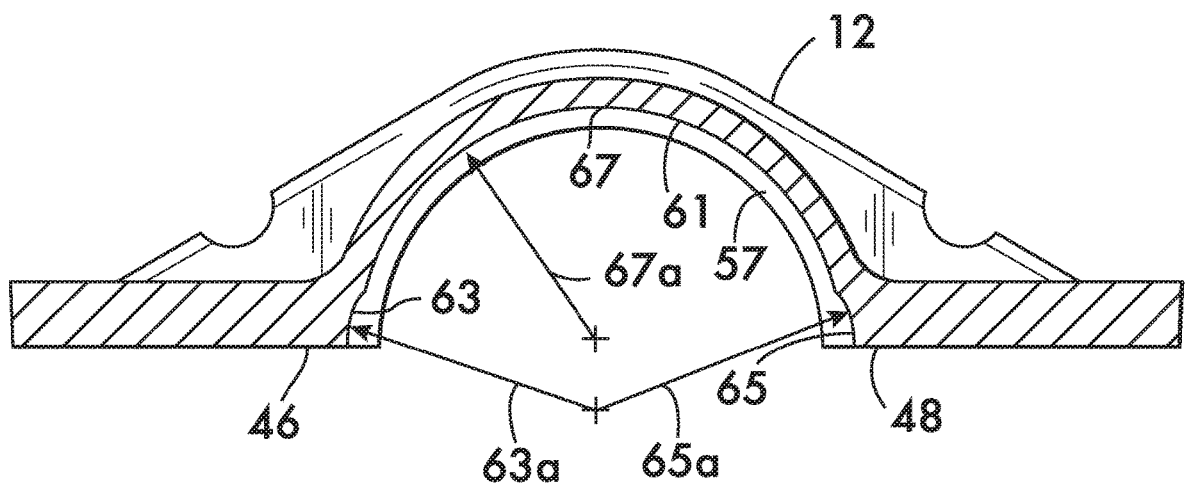
FIG. 3A is a cross sectional view taken at line 3A-3A of FIG. 2.

As shown in FIGS. 1 and 2, coupling 10 further comprises a first flange 52 positioned proximate to the second sides 32 of each segment 12 and 14. Flange 52 is formed of flange portions 52a and 52b on respective segments 12 and 14 and extends outwardly away from the central space 16. Flange 52 has a plurality of through holes 54 (see also FIG. 1A). The flange 52 and through holes 54 are designed to mate with the flange of a flanged end pipe element as described below. A second channel 56 is positioned in each segment 12, 14 between the first channels 34 and the first flanges 52. Second channels 56 extend circumferentially around and face the central space 16. Similar to first channels 34, second channels 56 are each defined by two side surfaces 57 and 59 arranged in spaced apart relation to one another as shown in FIG. 2. A floor surface 61 extends between the side surfaces. As shown in FIG. 3A, the floor surface 61 comprises first and second surface portions 63 and 65 arranged respectively at opposite ends 46 and 48 of the segments 12 and 14 (segment 12 being shown). A third surface portion 67 is positioned between the first and second surface portions 63 and 65. Each surface portion 63, 65 and 67 has a respective radius of curvature 63a, 65a and 67a. Radii 63a and 65a are greater than the radius of curvature 67a of the third surface portion 67. The centers of radii 63a and 65a are offset from the center of radius 67a as depicted in FIG. 3A. The first and second surface portions 63 and 65 may each have a length extending from about 5% to about 45% of the total length of the second channel 56 for practical coupling designs.

As shown in FIGS. 1 and 2, a split ring 58 is positioned within the first channels 34 of segments 12 and 14. Split ring 58 in this example comprises a plurality of teeth 60 arranged in spaced relation to one another. Teeth 60 extend circumferentially around the split ring 58 and project toward the central space 16. Such split rings are made of metal, such as spring steel, stainless steel or copper-beryllium alloys and are effective at retaining pipe elements made of HDPE or other polymer resins, to the coupling 10. The split ring 58 has an inner diameter 62 equal to or greater than the outer diameter of the pipe element. Teeth 60 may furthermore be angularly oriented to permit insertion of the pipe element into central space 16, but prevent its withdrawal.

Figure 1A:
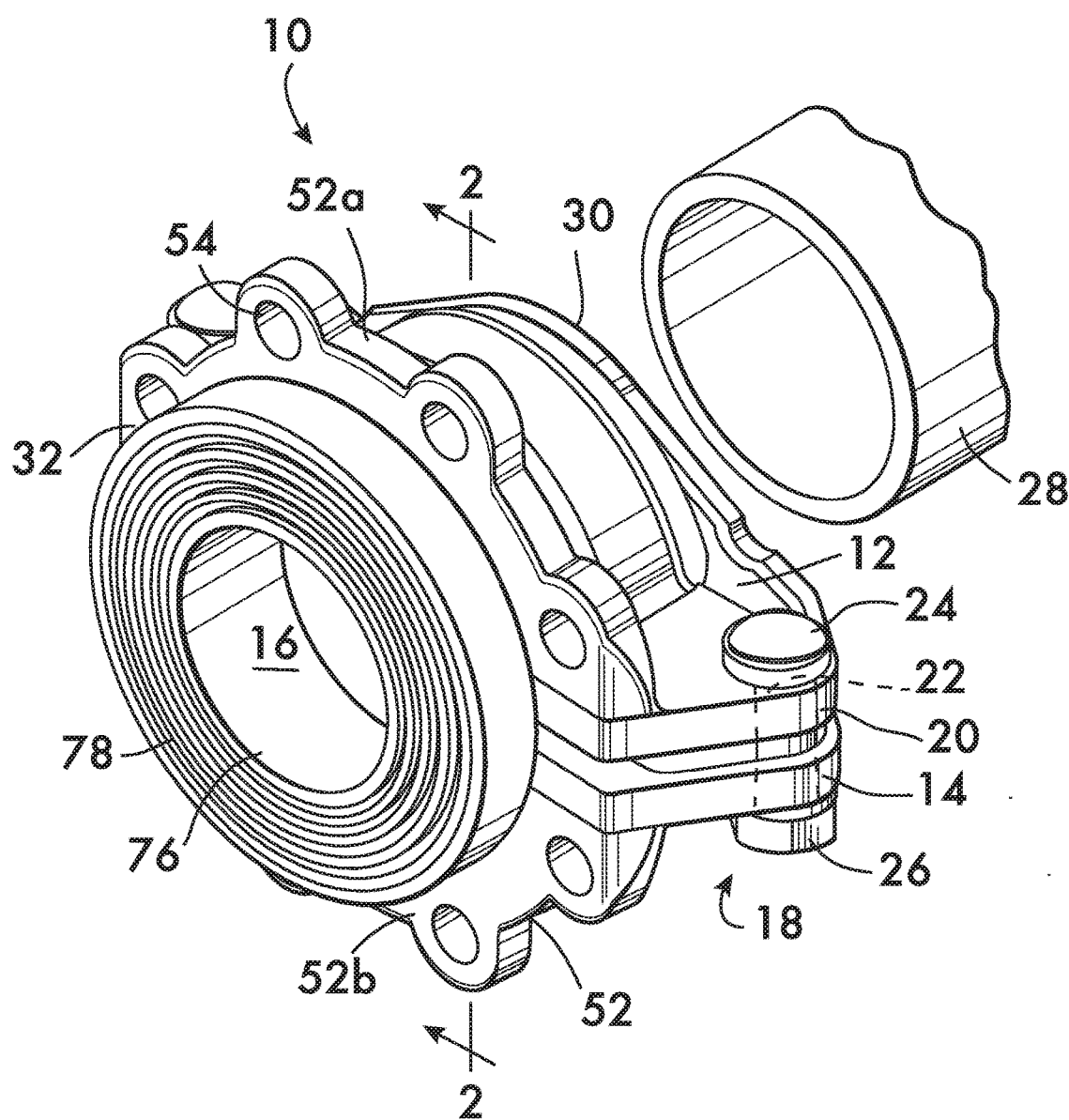
FIG. 1A is an isometric view of an example coupling according to the invention shown in a preassembled state.

Split ring 58 may be used to hold the segments 12 and 14 in spaced apart relation in the so-called "preassembled state", illustrated in FIG. 1A. Split ring 58 has an outer diameter 64 sized to engage the first and second surface portions 42 and 44 of floor surface 40 (see FIG. 3). These surface potions have radii of curvature 42a and 44a larger than the third surface portion 50 and are designed to cooperate with the split ring 58 for support of the segments 12 and 14 such that the pipe element 28 may be inserted into the central space 16 from side 30 when coupling 10 is in the preassembled state. Fasteners (bolts 24 and nuts 26) hold the segments 12 and 14 together and against the split ring 58, which has sufficient stiffness to support the segments during handling for installation but, being a split ring, is collapsible to a smaller diameter and permits the segments to be drawn toward one another and effect a fluid tight, mechanically restrained joint when the fasteners are tightened as described below.

Fluid tightness of the joint is afforded by a seal 66 positioned in the second channels 56 of segments 12 and 14 as shown in FIG. 2. In this example seal 66 comprises a flexible, resilient sealing ring 68. Sealing ring 68 has an outer surface 70 having a diameter 71. In an example embodiment, diameter 71 is sized either to support the segments 12 and 14 in spaced relation in the preassembled state, or to assist split ring 58 in supporting the segments. To this end outer diameter 71 is sized to engage the first and second surface portions 63 and 65 of floor surface 61 of the second channel 56 (see FIG. 3A). These surface portions have radii of curvature 63a and 65a larger than the third surface portion 67 and are designed to cooperate with the sealing ring 68 for support of the segments 12 and 14 to permit insertion of the pipe element 28 into the central space 16 from side 30 when coupling 10 is in the preassembled state shown in FIG. 1A. Sealing ring 68 may also have sufficient stiffness to support the segments during handling for installation. Sealing ring 68 may be formed of elastomers such as EPDM and is thus deformable upon tightening of the fasteners 24, 26 to permit a joint to be formed as described below.

To effect a fluid tight seal, sealing ring 68 has first and second ring inner surfaces 72 and 74 positioned on opposite sides of the sealing ring. Surface 72 is positioned and adapted to engage the outer surface of pipe element 28 upon insertion of the pipe element into the central space 16 (described below). As shown in FIG. 2, surface 74 is adapted to engage the outer surface of a tube 76 positioned within the central space 16. A barb 77 is positioned proximate one end of tube 76 to engage the lobe 74a on which inner surface 74 is positioned. Barb 77 extends circumferentially around and outwardly from tube 76 and helps retain the tube within sealing ring 68. Tube 76 is part of the coupling 10 and extends outwardly from the second sides 32 of the segments 12 and 14. A second flange 78 may extend outwardly from tube 76 and is positioned in spaced relation away from barb 77, adjacent to the first flange 52 when the opposite end of the tube 76 is engaged by the inner surface 74 of sealing ring 68 as illustrated in FIG. 2. It is advantageous to form tube 76 and its flange 78 as a unitary piece from a polymer resin such as HDPE. This design helps ensure fluid tightness of the joint as noted below. Sealing ring 68 may also have an inwardly projecting rib 80 that engages both the tube 76 and the pipe element 28 and acts as a stop to ensure proper depth of engagement between these components and the coupling 10.

Figure 6:
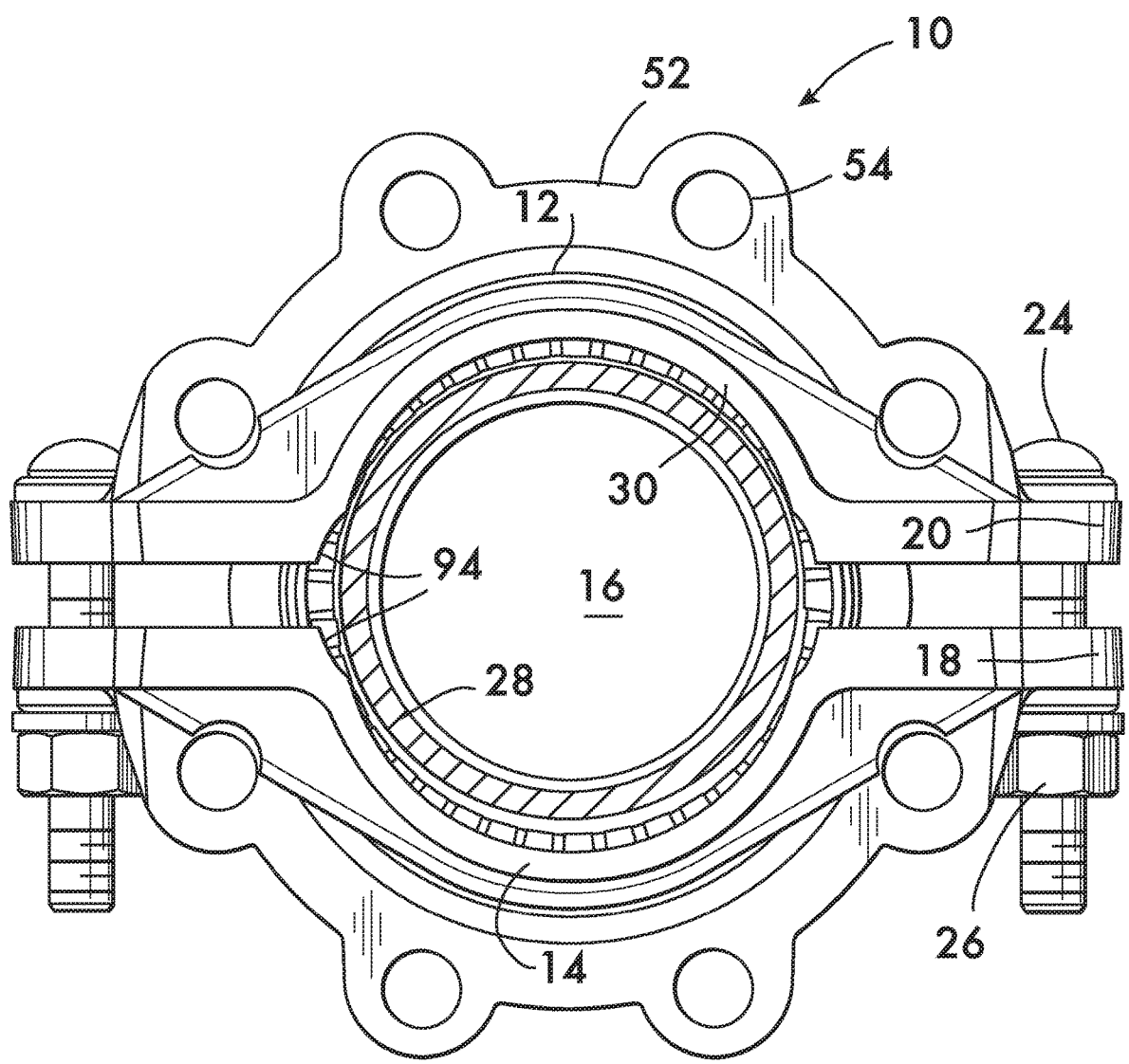
FIG. 6 is an axial view of the coupling shown in FIG. 1.

Installation of the coupling 10 is illustrated with reference to FIGS. 1A, 4, 5 and 6. Pipe element 28 is to be connected to a flanged pipe element 82 (see FIG. 5). As shown in FIGS. 1A and 6, the pipe element 28 is inserted into the central space 16 of coupling 10 from the first side 30 of the segments 12 and 14. Insertion is possible because the coupling 10 is in the preassembled state, with segments 12 and 14 supported in spaced relation either on seal 66 alone, split ring 58 alone, or on both the seal and the split ring. Insertion is further aided by notches 94 positioned in side surfaces 36, 38 of each segment 12 and 14. The notches 94 are positioned adjacent to the attachment members 18 (projections 20) and provide clearance for pipe element insertion which permits the segments 12 and 14 to be closer together in the preassembled state than would be possible in the absence of the notches. Once pipe element 28 is properly seated (the end engaging stop rib 80, the sealing ring inner surface 72 engaging the outer surface of the pipe element) fasteners 24, 26 are tightened thereby drawing segments 12 and 14 toward one another as shown in FIGS. 4 and 5. Motion of the segments 12 and 14 deforms both the split ring 58 and the seal 66.

Split ring 58 shrinks in circumference and diameter as it is forced to conform within the first channel 34. Shrinking of split ring 58 causes teeth 60 on the split ring to bite into the outer surface of the pipe element 28 and prevent its withdrawal from the coupling 10. Seal 66, constrained within the second channel 56, is compressed between the segments 12 and 14 as the segments are brought together. As shown in FIG. 5, the sealing ring inner surface 72 is forced into sealing engagement with the outer surface 84 of the pipe element 28, and sealing ring inner surface 74 is brought into sealing engagement with the outer surface 86 of tube 76.

With the segments 12 and 14 brought together as depicted in FIGS. 4 and 5, the first flange 52 is thus arranged so that its holes 54 may be aligned with corresponding holes 88 in the flange 90 of the flanged pipe element 82 to which the pipe element 28 is to be joined. As shown in FIG. 5, the coupling 10 is aligned with the flanged pipe element 82, holes 54 in the first flange 52 are aligned with holes 88 in flange 90 and fasteners 92 are received in holes 54 and 88 to connect the first flange 52 to the flange 90 of the flanged pipe element 82. Second flange 78 of tube 76 is captured between flange 90 and first flange 52. This configuration provides stiffness and stability to the joint as well as fluid tightness between the coupling 10 and the flanged pipe element 82 as the softer polymeric material comprising the second flange 78 is compressed between the metal flanges 90 and 52, which may comprise cast iron, steel or other durable metals.

Couplings according to the invention provide advantages over prior art methods and couplings for joining non-flanged polymeric pipe elements to flanged pipe elements. Being in a pre-assembled state, couplings according to the invention reduce the number of parts that must be handled during installation. Furthermore, the step of fusing a butt flange adapter to the non-flanged polymer pipe element is eliminated along with the need for a fusing machine. Installation time and complexity is thereby reduced substantially.

What is claimed is:

1. A method of using a combination, the combination comprising:

a plurality of segments attached to one another end to end in a preassembled state by fasteners to form a loop around a central space, each of said segments comprising a first side and a second side, wherein a channel is disposed between the first and second sides of the plurality of segments, wherein the channel extends circumferentially around and faces said central space;

a flexible, resilient sealing ring positioned in said channel, the sealing ring comprising first and second lobes that each extend radially inwardly to define first and second ring inner seal surfaces, respectively; and a tube comprising
a first end disposed and retained within the central space while said segments are in said preassembled state,
a first protrusion extending radially outwardly and disposed proximate the second sides of the plurality of segments, wherein the first protrusion limits an extent to which the first end of the tube can extend axially into the central space,
a second protrusion extending radially outwardly and disposed within the central space while said segments are in said preassembled state, wherein the second protrusion is axially disposed between the first protrusion and the first end, wherein the second sides of the plurality of segments and the first lobe of the sealing ring are both axially disposed between the first and second protrusions, wherein the first lobe is axially disposed between the second protrusion and the second sides of the plurality of segments, and the second protrusion extends radially outwardly farther than an inner radial extent of the first lobe such that the second protrusion and first lobe help retain the tube within the sealing ring while said segments are in said preassembled state, and
a sealing surface disposed between the first and second protrusions on an outer surface of the tube, the method comprising:
while the first end of said tube is retained in said central space with said segments in said preassembled state, axially inserting an end of a first pipe element into the central space; and
while the end of the first pipe element is inserted into the central space, tightening the fasteners, which draws the plurality of segments toward one another and the central space and thereby causing (1) the first ring inner seal surface to sealingly engage the sealing surface of the tube, and (2) the second ring inner seal surface to sealingly engage a sealing surface of the first pipe element.

2. The method of claim 1, wherein said tightening causes the second sides of the segments to move radially inwardly past an outer radial extent of the second protrusion.

3. The method of claim 1, further comprising attaching a second pipe element to the tube so as to form a fluid-tight seal between the second pipe element and the tube.

4. The method of claim 3, wherein said attaching occurs after said axially inserting and after said tightening.

5. The method according to claim 1, wherein said first and second protrusions each extend continuously around an entire circumference of the tube.

6. The method according to claim 1, further comprising joining said first pipe element with a second pipe element.

7. The method according to claim 6, wherein said first and second pipe elements comprise different types of pipe elements, and wherein the combination is an adapter coupling that is shaped and configured to join the different types of pipe elements to each other.

8. The method according to claim 1, wherein the sealing ring comprises a radially-inwardly projecting rib disposed between the first and second lobes.

9. The method according to claim 1, wherein the second protrusion extends radially outwardly less far than an inner radial extent of the second sides of the plurality of segments prior to tightening of the fasteners such that there is a radial clearance between the second protrusion and the second sides of the plurality of segments.

10. The method according to claim 1, further comprising:
   joining the first pipe element with a second pipe element; and
   attaching the combination to said first pipe element before attaching said second pipe element.

11. The method according to claim 1, wherein the first pipe element comprises a plain end pipe element.

12. The method according to claim 1, further comprising joining the first pipe element with a second pipe element with the combination, wherein the second pipe element comprises a flanged pipe element.

13. The method according to claim 12, further comprising mounting the tube and plurality of segments to said flanged pipe.

* * * * *